United States Patent [19]

Krivohlavek

[11] Patent Number: 5,256,710

[45] Date of Patent: Oct. 26, 1993

[54] METHOD OF PRODUCING, USING AND COMPOSITION OF PHENOLIC-TYPE POLYMER MODIFIED ASPHALTS OR BITUMENS

[75] Inventor: Dennis Krivohlavek, Claremore, Okla.

[73] Assignee: Asphalt Technology & Consultants, Inc., Claremore, Okla.

[21] Appl. No.: 916,217

[22] Filed: Jul. 17, 1992

[51] Int. Cl.$^5$ ............................................. C08L 95/00
[52] U.S. Cl. ........................................ 524/59; 524/68; 524/71
[58] Field of Search ..................... 524/59, 68, 71

[56] References Cited

U.S. PATENT DOCUMENTS

| | | | |
|---|---|---|---|
| H876 | 1/1991 | Gilmore et al. | 524/68 |
| 3,042,633 | 7/1962 | White | 524/68 |
| 3,253,521 | 5/1966 | Endres | 524/68 |
| 3,275,585 | 9/1966 | Baum | 525/54.5 |
| 3,275,586 | 9/1966 | Wurstner | 525/54.5 |
| 3,317,447 | 5/1967 | Black | 524/845 |
| 3,345,316 | 10/1967 | Nielsen | 524/68 |
| 3,540,906 | 11/1970 | Fauber et al. | 524/71 |
| 3,547,850 | 12/1970 | Montgomery | 524/705 |
| 3,577,250 | 5/1971 | Rostler et al. | 524/474 |
| 3,592,788 | 7/1971 | Rostler | 524/68 |
| 3,610,588 | 10/1971 | Diefenbach | 366/24 |
| 3,650,791 | 3/1972 | Fauber | 106/279 |
| 3,763,074 | 10/1973 | Rostler | 524/60 |
| 3,778,397 | 12/1973 | Gannon et al. | 524/60 |
| 3,803,066 | 4/1974 | Petrossi | 524/71 |
| 3,810,857 | 5/1974 | Garrigues | 524/59 |
| 3,859,227 | 1/1975 | Dwyer | 106/277 |
| 3,900,692 | 8/1975 | Rostler | 524/64 |
| 3,907,449 | 9/1975 | Bennett et al. | 404/75 |
| 3,915,914 | 10/1975 | Binder et al. | 524/71 |
| 3,936,406 | 3/1976 | Rion | 524/571 |
| 3,970,468 | 7/1976 | Garrigues et al. | 106/274 |
| 4,237,052 | 12/1980 | Fitoussi et al. | 527/500 |
| 4,242,246 | 12/1980 | Maldonado et al. | 524/71 |
| 4,330,449 | 5/1982 | Maldonado et al. | 524/68 |
| 4,338,136 | 6/1982 | Goullet et al. | 106/277 |
| 4,412,019 | 10/1983 | Kraus | 524/71 |
| 4,462,840 | 7/1984 | Schilling et al. | 106/277 |
| 4,554,313 | 11/1985 | Hagenbach et al. | 524/68 |
| 4,567,222 | 1/1986 | Hagenbach et al. | 524/276 |
| 4,576,648 | 3/1986 | Demangeon et al. | 524/59 |
| 4,818,367 | 4/1989 | Winkler | 524/69 |
| 5,055,135 | 10/1991 | Grube et al. | 428/228 |
| 5,110,962 | 5/1992 | Cahiez et al. | 423/49 |
| 5,112,752 | 5/1992 | Johnson et al. | 435/192 |
| 5,113,019 | 5/1992 | Vottero et al. | 568/42 |
| 5,120,449 | 6/1992 | Guillerme et al. | 210/725 |
| 5,120,777 | 6/1992 | Chaverot et al. | 524/68 |

FOREIGN PATENT DOCUMENTS

| | | | |
|---|---|---|---|
| 0234615 | 2/1987 | European Pat. Off. | |
| 3630132 | 3/1988 | Fed. Rep. of Germany | 524/71 |
| 0732340 | 5/1980 | U.S.S.R. | 524/68 |
| 0761527 | 9/1980 | U.S.S.R. | 524/71 |
| 0368236 | 8/1930 | United Kingdom | 524/59 |

*Primary Examiner*—Paul R. Michl
*Assistant Examiner*—Peter Szekely
*Attorney, Agent, or Firm*—Head & Johnson

[57] ABSTRACT

A method of producing cross-linked polymer modified asphalt or bitumen. The method includes the steps of combining by agitation polymers chosen from a group consisting of styrene rubber, styrene butadiene rubber, polydiene rubber and polyolefin diene rubber, 80 to 99% by weight of asphalt or bitumen, with the asphalt or bitumen at temperatures of 130° to 230° C. to form a homogeneous mixture. Thereafter, 0.05 to 2.0% by weight of asphalt of a reactive phenol-aldehyde resin is added to the mixture. The reaction is thereafter completed by continuing agitation of the mixture.

9 Claims, No Drawings

METHOD OF PRODUCING, USING AND COMPOSITION OF PHENOLIC-TYPE POLYMER MODIFIED ASPHALTS OR BITUMENS

BACKGROUND OF THE INVENTION

1. Field of the Invention

The present invention relates to a process of combining rubber elastomers or polymers to form modified asphalt compositions that are further cross linked or vulcanized with either phenolic or phenol-formaldehyde two-step resins either alone or in combination with each other and/or combinations with elemental sulfur, cross-linking or covulcanization catalysts or agents and (optionally) process oils to produce a product of enhanced performance suitable for commercial, construction and other industrial applications where asphalts or bitumens are to be used.

2. Description of the Prior Art

Polymer modified asphalt or bitumen have been known in the art for many years. The application of such materials has found utility in many fields or areas of the construction industry. These materials have also found utility in many industrial applications. In general these products have met with varying degrees of success in their respective fields of application. The degree of success of each product is related to its ease of process and to the final properties of that same process.

As a result of these previous works, polymer modified asphalts or bitumen offer the skilled technologist many potential process techniques. These techniques may involve the use of a polymer; polymer and oils in various combinations; polymers, oils and cross-linking agents and/or accelerators in combination; and other such similar or like processes in combination with the asphalt or bitumen to produce modified asphalts or bitumen. Among the processes currently available to those skilled in the art that cross link or vulcanize the polymer or rubber to or with the asphalt or bitumen, sulfur is the most widely described. Another process that is available to the skilled artisan is cross-linking or vulcanization by use of urethane chemistry. Although there are other processes described in prior art for vulcanization of polymers in asphalt or bitumen, these two process techniques still remain the most widely used in the industry to date.

As is taught by the previously disclosed art, polymer modification will further enhance asphaltic or bitumen materials and yield a more useful product for many construction or industrial applications. Previous art also discloses or teaches the skilled artisan that cross-linking or vulcanization processes may enhance the rubber or elastomeric polymer asphalt combination beyond that of simple polymer or polymer and oil processing alone.

The prior patents disclose processes for the use of various polymeric materials in asphalt or bitumen to enhance the performance of the resulting product over that of the original asphalt or bitumen. Many of the above patents disclose processes for the cross-linking (in the patents disclosing urethane or other types of cross-linking chemistry) or vulcanization (in the patents disclosing the use of elemental sulfur) many types of rubber or elastomers in or with the asphalt or bitumen.

Of all the prior patents, only one disclosed a process for using an aldehyde, U.S. Pat. No. 3,275,585 issued on Sep. 27, 1966 to L. A. H. Baum, P. F. Bruins and L. Henschel and assigned to Mobile Oil Corporation. In this disclosure the aldehyde is the main source of polymeric material and does not teach or disclose the use of any type of rubber or other elastomeric materials. The use level of the aldehyde is from 1 to 25% and preferably 5 to 15% based upon the weight of the asphalt present. The strong mineral acid catalyst used in the process may be present from 0.1 to 5.0% and preferably 0.1 to 2.0% based upon the weight of the asphalt.

Of all the prior patents, only one disclosed a process for using phenol, U.S. Pat. No. 3,253,521 issued on May 31, 1966 to H. A. Endres and assigned to The Goodyear Tire & Rubber Company. In this disclosure, the phenol is taught to be an antioxidant. It is known in the art that the chemical structure of phenols as antioxidants are not related to or the same as the chemical structure of phenols as cross-linking agents. Specifically, the Endres patent teaches the use of alkylated phenolic structures among others as antioxidants.

All of the prior art patents disclose technology related to methods, compositions or uses of polymer modified asphalts for use in industrial, construction, specialty or other applications. There were no patents or portions there of disclosing either methods, compositions or uses for or of phenolic based cross-linking or vulcanizing resins or reasonable facsimiles thereof in polymer modified asphalts for use in industrial, construction, specialty or other applications.

Many of these previous teachings illustrate enhanced properties such as improved viscosity; better compatibility between the polymer and asphalt or bitumen; higher ball and ring softening points; better heated storage stability; and many other enhancements or improvements to the asphalt or bitumen beyond that of the original material. While the teachings and practice of such processes have met with commercial success in their respective business segments, many of those skilled in the art find that certain limitations in combining rubber polymers, oils and asphalts or bitumen do still exist.

From the previous teachings of the processes disclosed in the current state of the art, it follows that improvements in the art of the vulcanization process which utilize styrene, butadiene and isoprene either alone or in combination and oils and asphalt or bitumen would be of benefit to those skilled in the knowledge of such processes and their products. Therefore, previous to the disclosure of the teachings of the process of this technology using either phenolic or phenol-formaldehyde two-step resins either alone or in combination with each other and/or combinations with elemental sulfur, cross-linking or covulcanization catalysts or agents and (optionally) process oils to produce a product of enhanced performance suitable for commercial, construction and other industrial applications where asphalts or bitumens are to be used were limited. Previous to this disclosure the skilled artisan could not utilize the advantages disclosed here in and attain the properties of the products of said process.

SUMMARY OF THE INVENTION

The present invention describes a process of combining styrenic rubber, vulcanizing agents, covulcanizing agents, accelerators, oils and asphalts or bitumen as a generalized procedure for combining these components in a useful fashion to yield polymer modified asphalts with enhanced properties. Examples of enhancements the products of the process will have are: higher ball and ring softening points; higher absolute viscosity;

greater elastic recovery; and less tendency to gel during processing or storage.

It is further the intent of this technology to describe the advantages of combining various vulcanization agents with either phenolic or phenol-formaldehyde two-step resins to achieve products of the process of intermediate properties between the initial bitumen and those of either phenolic or phenol-formaldehyde two-step resins combinations alone.

DETAILED DESCRIPTION OF THE PREFERRED EMBODIMENTS

Teachings of the preferred embodiments will enable a process which will successfully cross link or otherwise vulcanize a polymer in an asphalt or bitumen. The cross-linking or vulcanizing agents that are to be utilized in the preferred embodiment are of the chemical family known as phenolic or vulcanizing resins and two step phenol-formaldehyde cross-linking or vulcanizing resins. This disclosure will also teach; the use of sulfur as a co vulcanizing agent and the practical utility this technique may offer the skilled artisan; the use of accelerators in the process; the use of rubber or lube stock process oils known in the art as aromatic, napthenic or paraffinic process oils which may be used either alone or in combination in this process; the practical results of the process when rubber of the styrene and/or butadiene types are used as the primary polymer source and the advantages of the product of this process offers and last; and the overall improvements to be had by using phenols and/or phenol-formaldehyde cross-linking or vulcanizing agents in essentially sulfur free processing.

The phenolic and phenol-formaldehyde resins described above are of the general chemical structures and/or forms and/or compositions are such as to cause them to be known as cross-linking or vulcanizing agents. These materials are commercially manufactured and made available for the specific purpose of acting as sulfur free cross-linking or vulcanizing agents.

The chemical structure and/or form and/or composition of these cross-linking or vulcanizing agents will most likely vary substantially from the types of phenols and/or formaldenydes conventionally used as the source of or for the polymer structure. In actual practice then, the phenol or formaldehyde as the polymer source are polymerized in situ upon themselves to create higher molecular weight homologs of themselves. Whereas those phenols or formaldehyde of such chemical and physical composition as to lend themselves to act as cross-linking or vulcanizing agents are not further polymerized in situ to create higher molecular weight homologs of themselves. Rather, these type phenols and/or formaldehyde are themselves the component of a final product and have acted as the cross-linking or vulcanizing agent or chemical to cross link or vulcanize various types of rubber (saturated, unsaturated, natural or synthetic) into higher molecular products.

One of the practical and useful applications for using phenolic and/or phenol-formaldehyde resins was the unexpected and unusual result of not gelling the rubber polymer asphalt composition when elemental sulfur does or did cause a gel at the same use level and is therefore useless in commercial applications. The obvious commercial applications for this non gelling feature are several, the most important of which is that the processor still has a liquid material as opposed to a solid lump. The liquid material has the potential to be removed from a tank and salvaged or reworked. The solid lump will most likely necessitate the disposal of the tank in which it is contained.

Other useful and/or desirable improvements or characteristics to a polymer modified asphalt that may be obtained as a result of this process are: improved or higher ball and ring softening point; higher absolute viscosity at 60° C.; lower penetration at 25° C. and; higher percent elastic recovery values at 10° C. Where chemically unbound elemental or free sulfur is incorporated into the process, cross linked products of intermediate values between those of sulfur alone and the phenol and/or phenol-formaldehyde resins may be obtained.

Test Procedure

All the test procedures preformed for this disclosure followed the following: ASTM D36-86 for Ball and Ring Softening Point; ASTM D2171 for Absolute Viscosity at 60° C.; ASTM D5 for Penetration at 4° C. and 25° C.; the Percent Elastic Recovery procedure is given below.

The Percent Elastic Recovery procedure used in this disclosure was as follows:

(1) Follow ASTM D 113 for conditioning specimen except condition at 10° C.;
(2) Place specimen in ductilometer and stretch to 20 cm at a 5 cm/min pull rate;
(3) Stop ductilometer at 20 cm elongation;
(4) Allow sample to relax undisturbed for five (5) minutes;
(5) Cut the specimen about the center of its elongation point with scissors or other suitable instrument;
(6) Allow specimen to remain undisturbed for 60±2 minutes;
(7) At the end of the time period, move the head of the ductilometer toward zero until the two ends of the severed specimen barely touch;
(8) Record this distance as A;
(9) Using the following equation compute the Percent Elastic Recovery as: $\% ER = [(20-A)/20]*100$.

The procedure for making each batch mix is given below.

(1) Into a one quart metal container add 600 gms of asphalt.
(2) Place container containing the asphalt on hot plate.
(3) Stir at low speed with appropriate mixer—do not create a vortex.
(4) Heat material to maintain 155° to 160° C. while mixing.
(5) Increase mixing speed to vortex contents and add rubber.
(6) After rubber is added reduce mixing speed to eliminate vortexing.
(7) Continue mixing at 155° to 160° C. with no vortexing of contents until rubber/asphalt mixture is homogeneous.
(8) Upon achieving a homogeneous mixture, proceed as follows:
  (8.1) If specimen is a control, perform tests.
  (8.2) If specimen is to be cross linked without accelerator then:
    (8.2.1) Increase temperature to 185° to 190° C.;
    (8.2 2) Increase mixing speed to vortex contents;
    (8.2.3) Add cross-linking agents and allow to mix for 15 seconds;
    (8.2.4) Decrease mixing speed to eliminate vortexing;
    (8.2.5) Allow mixture to react for four (4) hours;

(8.2.6) Decrease temperature to 145° to 150° C.;
(8.2.7) Store and/or test cross linked polymer modified asphalt.

(8.3) If specimen is to be cross linked with accelerator then:
(8.3.1) Decrease temperature to 145° C.;
(8.3.2) Increase mixing speed to vortex contents;
(8.3.3) Add cross-linking agent and allow to mix for 15 seconds;
(8.3.4) Decrease mixing speed to eliminate vortexing;
(8.3.5) Allow mixture to react for four (4) hours;
(8.3.6) Store and/or test cross linked polymer modified asphalt.

EXAMPLES 1 AND 2 of TABLES IA and IB

The results of Experiments 1 and 2 along with their formulas are given in Tables IA and IB respectively. This data illustrates the new and/or novel ability of phenolic based cross-linking agents have in preventing gels as shown be the data generated in Example 2 of Table IA. As is shown by the data of Experiment 1 of Table IA, the same asphalt or formula known to create a gel did gel when using free elemental sulfur as a cross-linking agent as is known to those schooled in the art. The data generated in Example 2 of Table IA was generated after storage at 140° C. for 20 hours. Therefore one may conclude that new, novel and useful products can be made with improved gel and heat resistance in asphalts or with formulas that were previously unattainable or unknown to those schooled in the art.

TABLE IA

Non Gelling Feature of Phenolic Based Cross-linking Agents

| Example Number | Penetration @ 25.0° C. | Penetration @ 4.0° C. | Absolute Viscosity @ 60° C. | B&R Soft Point, °F. | % Elastic Recovery @ 10.0° C. |
|---|---|---|---|---|---|
| 1 | gel @ 3 hrs | gel @ 3 hrs | gel @ 3 hrs | gel @ 3 hrs | gel @ 3 hrs |
| 2 | 73 | 27 | 4173 | 140 | Not Ran |

TABLE IB

Formulary for Samples of TABLE IA

| Example Number | Asphalt or Bitumen | Rubber Type | Process Oil | X-Link Accelerator | Agent or Co-Agent |
|---|---|---|---|---|---|
| 1 | 100.00% AC-20 known to gel | 3.5% SBS Radial Polymer Structure | 1.80% Aromatic Type | 0.1% Free Elemental Sulfur | 0.05% Thiuram Known as TMTD |
| 2 | 100.00% AC-20 known to gel | 3.5% SBS Radial Polymer Structure | 1.80% Aromatic Type | 0.1% Phenol-Formaldehyde type | 0.05% Thiuram Known as TMTD |

TABLE IIA

Maximum and Minimum Polymer Concentrations for Phenolic Based Cross-linking Agents

| Example Number | Penetration @ 25.0° C. | Penetration @ 4.0° C. | Absolute Viscosity @ 60° C. | B&R Soft Point, °F. | % Elastic Recovery @ 10.0° C. |
|---|---|---|---|---|---|
| 1 | Not Ran | 130 | 204 | 89.5 | 35.00 |
| 2 | Not Ran | 127 | 255 | 90.5 | 58.75 |
| 3 | Not Ran | 109 | Not Ran | 180+ | 90.00 |
| 4 | Not Ran | 110 | Not Ran | 180+ | 88.75 |

TABLE IIB

Formulary for Samples of TABLE IIA

| Example Number | Asphalt or Bitumen | Rubber Type | Process Oil | X-Link Accelerator | Agent or Co-Agent |
|---|---|---|---|---|---|
| 1 | 100.00% Non Gel Flux Type | 1.0% SBS High MW Radial Polymer | None | None | None |
| 2 | 100.00% Non Gel Flux Type | 1.0% SBS High MW. Radial Polymer Structure | None | 2.0% Phenol-Formaldehyde-Rxn @ 185 to 190° C. | None |
| 3 | 100.00% Non Gel Flux Type | 20.0% SB Diblock Polymer Structure | None | None | None |
| 4 | 100.00% Non Gel Flux Type | 20.0% SB Diblock Polymer | None | 0.2% Phenol-Formaldehyde | 0.1% Thiuram Known |

TABLE IIB-continued

| | Formulary for Samples of TABLE IIA | | | | |
|---|---|---|---|---|---|
| Example Number | Asphalt or Bitumen | Rubber Type | Process Oil | X-Link Accelerator Type | Agent or Co-Agent as TMTD |

EXAMPLES 1 THROUGH 4 of TABLES IIA and IIB

The asphalt or bitumen used in the Examples 1 through 4 of Tables IIA and IIB was a refined asphalt flux known by those schooled in the art of polymer modified asphalts to resist gelling.

Examples 1 and 2 of Table IIA with their respective formula given in Table IIB illustrate the utility of phenolic cross-linking agents at low levels of polymer concentration. The polymer used for Examples 3 and 4 was a SB diblock with carboxylic (COOH) functionality. Example 1 has no cross-linking agent in its formula as shown in Table IIB. Example 2 has a phenolic cross-linking agent present and was reacted at 185° to 190° C. to also illustrate the use of accelerators or co-agents as an option not necessarily required. As one may see from the greater elastic recovery of Example 2 a cross-linking or vulcanizing reaction has taken place within the process. Further evidence of this cross-linking or vulcanizing reaction is reflected in the higher Absolute Viscosity of Example 2.

Examples 3 and 4 of Table IIA with their respective formulas given in Table IIB illustrate the utility of phenolic cross-linking agents at high levels of polymer concentration. Example 3 does not have any cross-linking agent present in its formula as shown in Table IIB. Example 4 has a phenolic cross-linking agent present and an accelerator or co-agent present as given in Table IIB. As is shown in the comparison of Elastic Recovery data between Example 3 and Example 4, no adverse effect such as gelling or to be made other wise unusable due to cross-linking or vulcanizing with phenols is evident. A further evidence of the ability of phenolic cross-linking or vulcanizing agents to preform at higher polymer levels is reflected in that the Penetration at 25° C. is relatively unchanged between these two examples.

Due to the visibly high viscosity of these two examples, process temperatures were at times in excess of 200° C. and upon occasion were 220° C. for various periods of time. It is known in the art that thermal degradation of rubber accelerates greatly at temperatures in excess of 200° C. It has been previously taught in this disclosure that phenolic based cross-linking agents are more resistant to heat degradation and gelling that previous state of the art. Therefore, the lower elastic recovery of Example 4 (ER=88.75) as opposed to that of Example 3 (ER=90.00) is most likely the result of the improvements taught of the process of this disclosure.

TABLE IIIA

| | Features of Phenolic Based Cross-linking Agents | | | | |
|---|---|---|---|---|---|
| Example Number | Penetration @ 25.0° C. | Penetration @ 4.0° C. | Absolute Viscosity @ 60° C. | B&R Soft Point, °F. | % Elastic Recovery @ 10.0° C. |
| 1 | 139 | Not Ran | 1263 | 111 | 57.75 |
| 2 | 125 | Not Ran | 1692 | 115 | 83.75 |
| 3 | 127 | Not Ran | 1393 | 126 | 68.75 |
| 4 | 129 | Not Ran | 2495 | 118 | 73.75 |
| 5 | 123 | Not Ran | Not Ran | 126 | 71.25 |
| 6 | 138 | Not Ran | 1726 | 125 | 78.15 |
| 7 | 141 | Not Ran | Not Ran | 110 | 56.87 |
| 8 | 130 | Not Ran | Not Ran | 114 | 61.25 | nolic cross-linking agents at high levels of polymer

TABLE IIIB

| | Formulary for Samples of TABLE IIIA | | | | |
|---|---|---|---|---|---|
| Example Number | Asphalt or Bitumen | Rubber Type | Process Oil | X-Link Accelerator | Agent or Co-Agent |
| 0 | 100.00% Refinery A.C. or Bitumen Non Gel | None | None | None | None |
| 1 | 100.00% Refinery A.C. or Bitumen Non Gel | 3.0% SBS Medium MW Radial Polymer Structure | None | None | None |
| 2 | 100.00% Refinery A.C. or Bitumen Non Gel | 3.2% SBS Medium MW Radial Polymer Structure | None | 0.1% Phenol-Type | 0.05% Thiuram Known as TBUT |
| 3 | 100.00% Refinery A.C. or Bitumen Non Gel | 3.2% SBS Medium MW Radial Polymer Structure | None | 0.1% Phenol-Formaldehyde Type | 0.05% Thiuram Known as TBUT |
| 4 | 100.00% Refinery | 3.2% SBS Medium MW | | 0.1% Free | 0.05% Thiuram |

TABLE IIIB-continued

| | Formulary for Samples of TABLE IIIA | | | | |
|---|---|---|---|---|---|
| Example Number | Asphalt or Bitumen | Rubber Type | Process Oil | X-Link Accelerator | Agent or Co-Agent |
| | A.C. or Bitumen Non Gel | Radial Polymer Structure | | Elemental Sulfur | Known as TBUT |
| 5 | 100.00% Refinery A.C. or Bitumen Non Gel | 3.2% SBS Medium MW Radial Polymer Structure | None | 0.05% Free Elemental Sulfur and 0.05% Phenol-Formaldehyde Type | 0.05% Thiuram Known as TBUT |
| 6 | 100.00% Refinery A.C. or Bitumen Non Gel | 3.2% SBS Medium MW Radial Polymer Structure | None | 0.1% Phenol-Formaldehyde Type | 0.05% Thiuram Known as TMTD |
| 7 | 100.00% Refinery A.C. or Bitumen Non Gel | 3.2% SBS Medium MW Linear Polymer Structure | None | None | None |
| 8 | 100.00% Refinery A.C. or Bitumen Non Gel | 3.2% SBS Medium MW Linear Polymer Structure | None | 0.1% Phenol-Formaldehyde Type | 0.1% Thiuram Known as Activated Dithocarbamate |

EXAMPLES 0 THROUGH 8 of TABLES IIIA and IIIB

The asphalt or bitumen used throughout the generation of the data for each example given in Table IIIA is a refined crude oil material with the physical properties given in Example 0 of Table IIIA. This information is also reflected in Table IIIB with the formulary showing no additional polymeric or cross-linking additives present.

For comparative purposes Example 1 of Table IIIA illustrates data generated by the addition of only the polymer to the asphalt of Example 0. This information is also reflected in Table IIIB with the formulary showing only asphalt and polymer present.

The polymer used in Examples 1 through 6 was the same medium molecular weight radially structured styrene butadiene styrene (SBS) rubber. The polymer used in Examples 7 and 8 was the same medium molecular weight linear triblock styrene butadiene styrene structure. This information is reflected in Table IIIB for each of the respective formulary. The result of a general comparison of the data for Examples 0 through 8 illustrate the over all utility of cross-linking or vulcanizing with phenolic and/or combinations of phenolic and other cross-linking or vulcanizing agents to create new and useful polymer modified asphalts or bitumen regardless of the polymer type or structure. This utility is specifically evident when comparing the Elastic Recovery of Examples 2, 3, 5, 6 and 8 where each is well above the Elastic Recovery of Examples 1 and 7 which have no cross-linking agent or co-agent present.

Example 4 of Table IIIA is given to illustrate the effects of a free elemental sulfur cross-linking or vulcanizing process as known in the art with this asphalt and polymer. By comparing formulary of Table IIIB and the Elastic Recovery (ER) as given in Table IIIA of Example 4 (ER=73.75) with those of; Example 3 (ER=68.75) which is the same formula percent cross-linking agent per Table IIIB except for the use of a Phenol-Formaldehyde cross-linking resin and; Example 5 (ER=71.25) which is also the same formula percent cross-linking agent per Table IIIB except as an equal part combination of free elemental sulfur and Phenol-Formaldehyde; it is now possible to create products of intermediate properties to those previously known to those schooled in the art of polymer modified asphalt processing.

Example 6 of Table IIIA is given to illustrate the effects of a change in the accelerator or co-agent upon a phenolic type cross linked polymer modified asphalt product. The Elastic Recovery (ER=78.15) of Example 6 is enhanced by the presence of the Thiuram accelerator known as Tetramethyl Thiuram Disulfide beyond the Elastic Recovery (ER=68.75) of Example 3 which has a Thiuram accelerator known as Tetrabutyl Thiuram Disulfide. Note that a direct comparison of Absolute Viscosity at 60° C. between Example 6 and Example 3 (1726 vs 1393 respectively) indicates higher viscosity polymer modified asphalts are now possible based upon the selection of the accelerator or co-agent present in the formulary.

Example 7 and Example 8 of Table IIIA teaches the use of phenolic based cross-linking in processing polymer structures other than those known as radial such as was used in Example 6 of the same table. In comparing the formulary of Example 7 to Example 8 as given in Table IIIB, the only difference is found to be the presence of the phenol-formaldehyde cross-linking agent and the activated dithiocarbamate. The respective Elastic Recovery data of Example 7 (ER=56.87) and Example 8 (ER=61.25) in Table IIIA reflect the application of the disclosed art in the enhanced value of the Elastic Recovery in Example 8.

The formulary of Example 8 as given in Table IIIB further reflects the teachings of the use of activated dithiocarbamates. Activated Dithiocarbamates are known in the art to have utility at low vulcanization temperatures and acts as a sulfur donor. From the results of Example 8 it is possible to use very low amounts (0.01% in Example 8) of accelerators or co-agents in combination with phenolic cross-linking agents or combinations there of as now taught in this disclosure. Other non limiting accelerators or co agents that would most likely find similar utility as a result of the teachings of this disclosure may be those known as Amine types, Dithiocarbamates other than those given specifically in this disclosure, Guanidine, sulfenamides, Thiazoles, Thioureas, Thiurams other than those given specifically in this disclosure, indine types, morpholine types, Phosphor types or complexes or peroxides (which themselves may act as cross-linking agents) or other similar or like compositions.

Other non limiting examples of materials or components that may find utility in the application of the teachings disclosed here in are: Polymers with unsaturated carbon bonding such as but not limited to; other butadiene rubber in emulsion, latex, solid, solvent or structural or chemical forms or combinations; butyl or butylene rubber in emulsion, latex, solid, solvent or structural or chemical forms or combinations; ethylene/butylene diene type rubber in emulsion, latex, solid, solvent or structural or chemical forms or combinations; ethylene/propylene diene type rubber in emulsion, latex, solid, solvent or structural or chemical forms or combinations; isoprene rubber in emulsion, latex, solid, solvent or structural or chemical forms or combinations; or natural rubber in emulsion, latex, solid, solvent or structural or chemical forms or combinations; or other like or similar polymeric materials and/or combinations with or without other forms or unsaturation such as but not limited to those known as amine in nature or structure, carboxylic in nature or structure, hydroxyl in nature or structure or other like or similar unsaturations and: process oils and/or solvents known to those schooled in the art as napthenic, paraffinic, aromatic, cycle oils, coal tar oils or extracts, kerosine, diesel, naphtha and the like and/or similar materials or combinations of those materials.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of producing cross linked polymer modified asphalt or bitumen, which method comprises:
   (a) combining by agitation polymers chosen from the group consisting of styrene rubber, styrene butadiene rubber, polydiene rubber and polyolefin diene rubber, 80 to 99% by weight of asphalt or bitumen, with said asphalt or bitumen at temperatures of 130° to 230° C. to form a homogeneous mixture;
   (b) adding 0.05 to 2.0% by weight of asphalt of a reactive phenol-aldehyde resin to the mixture; and
   (c) continuing agitation of the mixture to complete the reaction.

2. A method of producing polymer modified asphalt or bitumen according to claim 1, wherein said reactive phenol-aldehyde resin is made heat reactive by inclusion of methyol or made as a two step reactive resin by inclusion of hexamethylenetetramine.

3. A method of producing polymer modified asphalt or bitumen according to claim 1, including the additional step of adding process oils to the mixture or components thereof.

4. A method of producing polymer modified asphalt or bitumen according to claim 1, including the additional step of adding accelerators or co-agents to the mixture or components thereof.

5. A method of producing polymer modified asphalt or bitumen according to claim 1, wherein said reactive phenol-aldehyde resin includes free elemental sulfur or sulfur donor accelerators of greater than 0.01% by weight of said asphalt.

6. A method of producing polymer modified asphalt or bitumen according to claim 4 characterized by the use of activated sulfur donor accelerators greater than 0.01% by weight of asphalt.

7. An asphalt polymer composition comprising of 80 to 99% by weight of asphalt having a penetration of from 30 to 350+; 1 to 20% by weight polymer chosen from the group consisting of styrene rubber, styrene butadiene rubber, polydiene rubber and polyolefin diene rubber; and 0.05 to 2% by weight of asphalt of reactive phenol-aldehyde resin.

8. A composition according to claim 7 wherein the polymer is selected from the group consisting of di block, linear tri block, radial or similar block copolymers or their combinations.

9. A method of producing polymer modified asphalt or bitumen according to claim 5 wherein said sulfur donor accelerators are chosen from a group consisting of tetrabutyl thiuram disulfide, tetramythyl thiuram disulfide and activated dithio carbonate.

* * * * *